US012809183B2

(12) United States Patent
Yamamoto

(10) Patent No.: US 12,809,183 B2
(45) Date of Patent: Nov. 24, 2026

(54) HEAD-MOUNTED DEVICE CAPABLE OF CONTROLLING DISPLAY BRIGHTNESS BASED ON A DEGREE OF EYE OPENING

(71) Applicant: Sharp Display Technology Corporation, Kameyama City (JP)

(72) Inventor: Keiichi Yamamoto, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/282,205

(22) Filed: Jul. 28, 2025

(65) Prior Publication Data

US 2026/0029648 A1 Jan. 29, 2026

(30) Foreign Application Priority Data

Jul. 29, 2024 (JP) ................................ 2024-122407

(51) Int. Cl.

| | |
|---|---|
| ***G02B 27/01*** | (2006.01) |
| ***G02B 27/00*** | (2006.01) |
| ***G02F 1/13357*** | (2006.01) |
| ***G09G 3/36*** | (2006.01) |
| *G09G 3/34* | (2006.01) |

(52) U.S. Cl.

CPC ..... *G02B 27/0172* (2013.01); *G02B 27/0093* (2013.01); *G02F 1/133603* (2013.01); *G09G 3/3611* (2013.01); *G02B 2027/0178* (2013.01); *G09G 3/3406* (2013.01); *G09G 2310/08* (2013.01)

(58) Field of Classification Search

CPC ........... G02B 27/0093; G02B 27/0172; G02B 2027/0178; G02F 1/133603; G09G 3/3611; G09G 3/3406; G09G 2310/08

See application file for complete search history.

(56) References Cited

U.S. PATENT DOCUMENTS

| | | | | |
|---|---|---|---|---|
| 2017/0115839 A1* | 4/2017 | Park | ........................ | G06F 3/013 |
| 2022/0197377 A1* | 6/2022 | Kim | ........................ | G06F 3/013 |
| 2023/0071993 A1* | 3/2023 | Sztuk | ...................... | G06F 3/013 |

FOREIGN PATENT DOCUMENTS

| | | | | | |
|---|---|---|---|---|---|
| CN | 101676982 A | * | 3/2010 | | |
| CN | 111736691 A | * | 10/2020 | ............. | G06F 3/013 |
| JP | 2008209610 A | | 9/2008 | | |

* cited by examiner

*Primary Examiner* — Adam J Snyder

(74) *Attorney, Agent, or Firm* — ScienBiziP, P.C.

(57) ABSTRACT

A head-mounted device includes a detection unit that detects a degree of opening of an eye, a display including a light-emitting unit that emits light, and a controller that controls a brightness of the light based on the degree of opening.

11 Claims, 10 Drawing Sheets

HEAD-MOUNTED DEVICE CAPABLE OF CONTROLLING DISPLAY BRIGHTNESS BASED ON A DEGREE OF EYE OPENING

BACKGROUND

1. Field

The present disclosure relates to a head-mounted device.

2. Description of the Related Art

Japanese Unexamined Patent Application Publication No. 2008-209610 discloses a mobile device. The mobile device is configured such that in a case where a viewer's line of sight is not directed onto a liquid crystal display panel unit, all matrix elements of a backlight unit are turned off. In a case where the viewer's line of sight is directed onto the liquid crystal display panel unit, the location of the eyepoint on the liquid crystal display panel is calculated, and of all matrix elements that constitute the backlight unit, only matrix elements corresponding to an area around the location of the eyepoint thus calculated are turned on. This allows the mobile device to consume less electricity (paragraphs 0011, 0012, 0016, 0017, and 0023).

The mobile device disclosed in Japanese Unexamined Patent Application Publication No. 2008-209610 is configured such that the liquid crystal display panel is also turned on in a case where the viewer is not looking at the liquid crystal display panel with his/her eyes blinking. This disables the mobile device to consume sufficiently less electricity.

It is desirable to provide a head-mounted device that makes it possible to reduce power consumption.

SUMMARY

According to an aspect of the disclosure, there is provided a head-mounted device including a detection unit that detects a degree of opening of an eye, a display including a light-emitting unit that emits light, and a controller that controls a brightness of the light based on the degree of opening.

DESCRIPTION OF THE EMBODIMENTS

Figure 1:
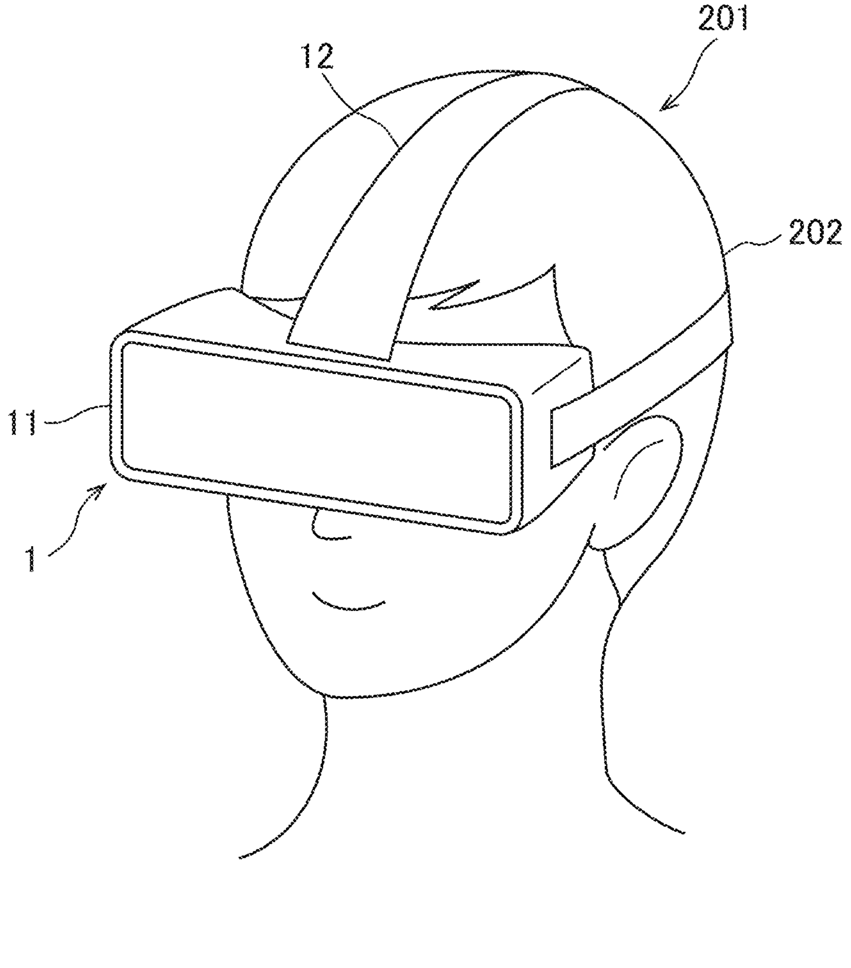
FIG. 1 is a perspective view schematically illustrating a head-mounted device of a first embodiment and a person wearing the head-mounted device.

The following describes embodiments of the present disclosure with reference to the drawings. In the drawings, identical or equivalent elements are given identical reference signs, and a repeated description is omitted.

1 First Embodiment 1.1 Appearance of Head-Mounted Device

FIG. 1 is a perspective view schematically illustrating a head-mounted device of a first embodiment and a person wearing the head-mounted device.

As illustrated in FIG. 1, the head-mounted device 1 of the first embodiment is mounted on a head 202 of the person 201 and displays an image that is recognized by the person 201. The head-mounted device 1 is a goggle-shaped head-mounted device. The head-mounted device 1 may be a head-mounted device other than a goggle-shaped head-mounted device. For example, the head-mounted device 1 may be a glasses-shaped head-mounted device, a helmet-shaped head-mounted device, or other devices.

The head-mounted device 1 is a cross reality (XR) device. Examples of cross reality devices include virtual reality (VR) devices, augmented reality (AR) devices, mixed reality (MR) devices, and substitutional reality (SR) devices.

As illustrated in FIG. 1, the head-mounted device 1 includes a body 11 and a strap 12.

The body 11 is placed in front of eyes of the head 202 and displays an image that is visually recognized by the eyes.

The strap 12 fixes the body 11 to the head 202. This causes the strap 12 to maintain a state in which the body 11 is placed in front of the eyes of the head 202. The strap 12 may be replaced by another type of fixing mechanism. For example, the strap 12 may be replaced by temples.

1.2 Interior of Head-Mounted Device

Figure 2:
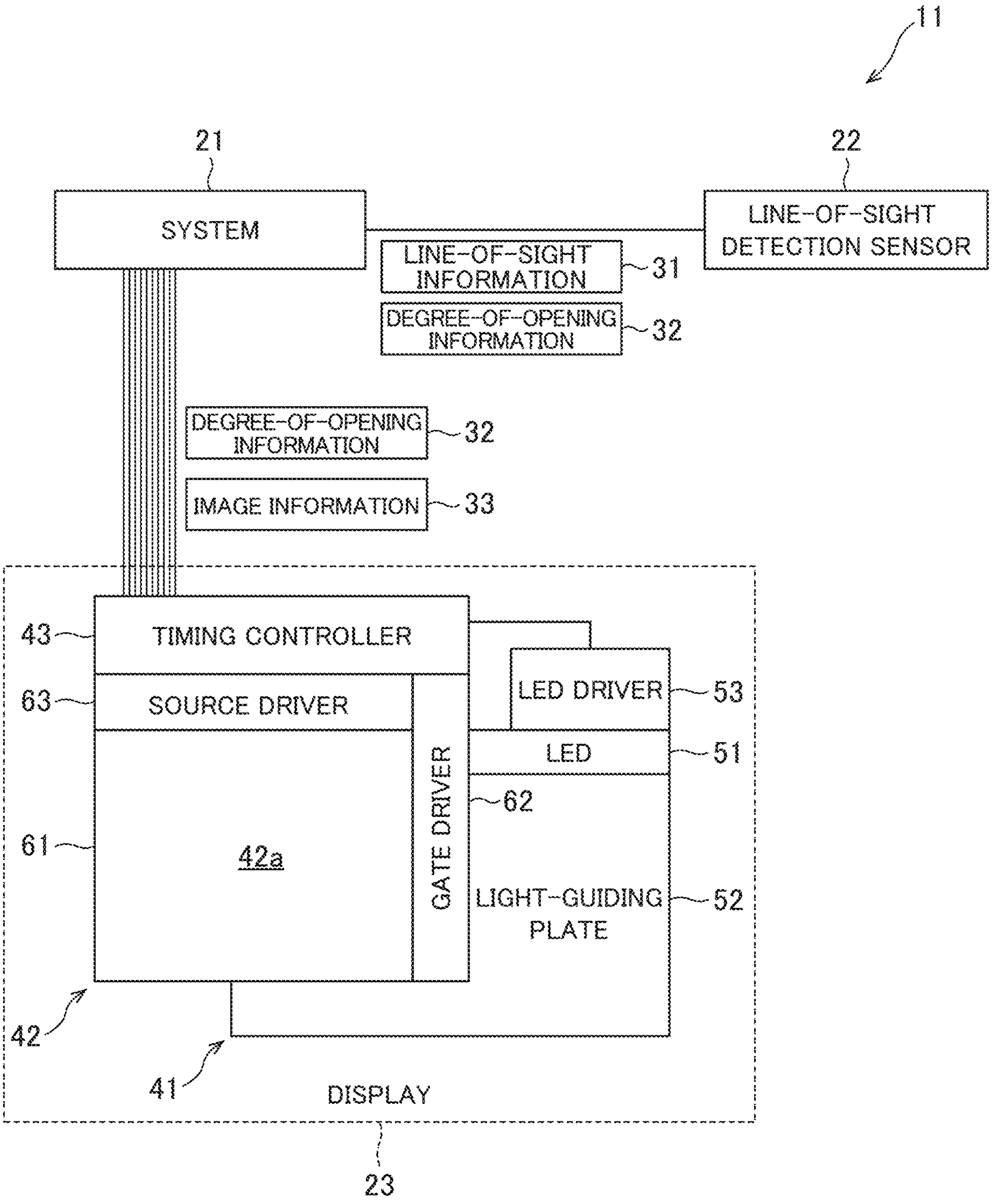
FIG. 2 is a block diagram of a body of the head-mounted device of the first embodiment.

FIG. 2 is a block diagram of the body of the head-mounted device of the first embodiment.

As shown in FIG. 2, the body 11 includes a system 21 and, for each of the right and left eyes, includes a line-of-sight detection sensor 22 and a display 23.

The line-of-sight detection sensor 22 detects a line of sight of the eye and a degree of opening of the eye and outputs line-of-sight information 31 representing the line of sight thus detected and degree-of-opening information 32 representing the degree of opening thus detected of the eye.

The line-of-sight detection sensor 22 includes an image sensor and an image processing circuit (both not illustrated). The image sensor takes images of the eye and an area therearound. By so doing, the image sensor creates image data representing an image including an image of the eye. The image processing circuit generates the line-of-sight information 31 and the degree-of-opening information 32 by processing the image data thus generated. The image processing circuit image-recognizes the image of the eye and detects the line of sight of the eye and the degree of opening of the eye from the image thus image recognized of the eye. The image sensor is a charge-coupled device (CCD) image sensor, a complementary metal-oxide semiconductor (CMOS) image sensor, or other image sensors.

The system 21 outputs the degree-of-opening information 32 and image information 33. The degree-of-opening information 32 is added to the image information 33. The system 21 is constituted by a processing circuit, a microcontroller, or other components. The microcontroller includes a processor and a memory. The processor executes a program stored in the memory and causes the microcontroller to perform all or some of processes that are performed by the system 21.

The display 23 emits light that displays an image corresponding to the image information 33 thus outputted. The display 23 emits light of brightness corresponding to the degree-of-opening information 32 thus outputted.

In recent years, most head-mounted devices include line-of-sight detection sensors. For this reason, it is often unnecessary to provide a head-mounted device with an additional line-of-sight detection sensor to providing the head-mounted device with a function of emitting light having brightness corresponding to the degree-of-opening information 32. However, in a case where the function is provided to a head-mounted device including no line-of-sight detection sensor, the head-mounted device needs to be provided with an additional line-of-sight detection sensor.

1.3 Display

As illustrated in FIG. 2, the display 23 includes a backlight 41, a liquid crystal panel 42, and a timing controller 43.

The backlight 41 emits light.

The liquid crystal panel 42 displays an image by modulating the light thus emitted.

The timing controller 43 controls the liquid crystal panel 42 in accordance with the image information 33. Bo so doing, the timing controller 43 causes the liquid crystal panel 42 to modulate the light in accordance with the image information 33.

The timing controller 43 controls the backlight 41 in accordance with the degree-of-opening information 32. By so doing, the timing controller 43 causes the backlight 41 to emit the light in accordance with the degree-of-opening information 32. The timing controller 43 controls the brightness of the light based on the degree of opening of the eye as represented by the degree-of-opening information 32. This allows the light to have brightness suited to the degree of opening of the eye. This makes it possible to reduce the power consumption of the backlight 41. The timing controller 43 decreases the brightness of the light in a case where the degree of opening of the eye indicates that the eye is closed. This makes it possible to decrease the brightness of the light in a case where a blink or other actions makes the person 201 unable to recognize an image displayed on the display 23. This makes it possible to reduce the power consumption of the backlight 41 without hindering the person 201 from recognizing an image displayed on the display 23. Decreasing the brightness of the light is performed by turning off the display 23 by turning off the backlight 41. Decreasing the brightness of the light may be performed by dimming the display 23 by dimming the backlight 41.

1.4 Backlight

The backlight 41 is an edge-lit backlight. For this reason, as shown in FIG. 2, the backlight 41 includes a light-emitting diode (LED) 51, a light-guiding plate 52, and an LED driver 53. The backlight 41 may be a direct-lit backlight.

The LED 51 emits light.

The light-guiding plate 52 guides light falling on an end face of the light-guiding plate 52, causes the light thus guided to be emitted from a principal surface of the light-guiding plate 52, and illuminates a display area 42*a* of the liquid crystal panel 42 with the light thus emitted. The light-guiding plate 52 substantially uniformly illuminates the display area 42*a* of the liquid crystal panel 42.

The LED driver 53 drives the LED 51 to cause the LED 51 to emit the light.

The timing controller 43 can control a timing at which the timing controller 43 causes the LED driver 53 to turn on the LED 51. The timing controller 43 turns on the LED 51 in a case where the degree of opening of the eye as represented by the degree-of-opening information 32 indicates that the eye is open. The timing controller 43 turns off the LED 51 in a case where the degree of opening of the eye indicates that the eye is closed.

1.5 Liquid Crystal Panel

As shown in FIG. 2, the liquid crystal panel 42 includes a liquid crystal panel body 61, a gate driver 62, and a source driver 63. The liquid crystal panel body 61 includes n gate lines, m source lines, and m×n pixels (all not illustrated). The m×n pixels are placed in the display area 42*a* of the liquid crystal panel 42. n and m are integers larger than or equal to 2.

The gate driver 62 drives a gate line selected from among the n gate lines. By so doing, the gate driver 62 brings, into a voltage-writable state, m pixels connected to the gate line thus selected.

The source driver 63 drives the m source lines. By so doing, the source driver 63 writes a voltage to the m pixels each connected to the m source lines and brought into a voltage-writable state. By so doing, the source driver 63 causes the m pixels to have light transmittance corresponding to the voltage thus written.

The timing controller 43 exercises control of the gate driver 62. The gate driver 62 selects and drives the n gate lines in sequence in accordance with the control.

The timing controller 43 exercises control of the source driver 63. The source driver 63 drives the m source lines with a voltage corresponding to one line of image information, contained in the image information 33, that corresponds to the gate line thus selected, writes, to the m pixels connected to the gate line thus selected, the voltage corresponding to the one line of image information, and causes the m pixels to have light transmittance corresponding to the one line of image information.

Through these, the gate driver 62 and the source driver 63 writes a voltage corresponding to the image information 33 to the m×n pixels in accordance with the control exercised by the timing controller 43 and causes the m×n pixels to have light transmittance corresponding to the image information 33. By so doing, the timing controller 43 causes the liquid crystal panel 42 to modulate the light in accordance with the image information 33.

1.6 Turning on and Turning on of Backlight

Figure 3:
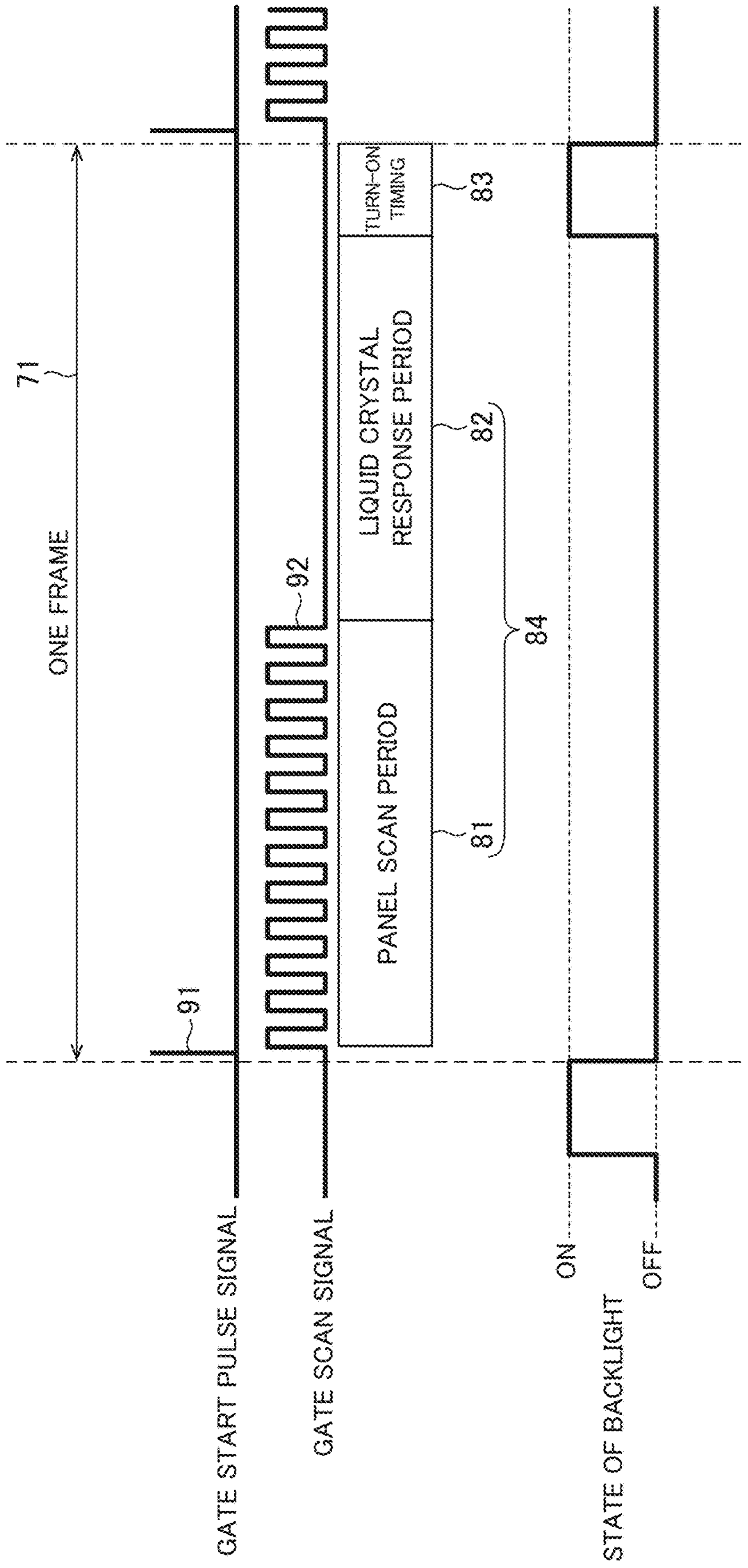
FIG. 3 is a timing chart showing the waveform of a gate start pulse signal that is outputted by a timing controller of the head-mounted device of the first embodiment, the waveform of a gate scan signal that is outputted by a gate driver of the head-mounted device, and time changes in state of a backlight of the head-mounted device.

FIG. 3 is a timing chart showing the waveform of a gate start pulse signal that is outputted by the timing controller of the head-mounted device of the first embodiment, the waveform of a gate scan signal that is outputted by the gate driver of the head-mounted device, and time changes in state of the backlight of the head-mounted device.

In the timing chart of FIG. 3, the horizontal axis represents time, and the vertical axis represents the level of a gate start pulse signal, the level of a gate scan signal, and the state of the backlight 41.

As shown in FIG. 3, one frame 71 that is each of a plurality of frames include a panel scan period 81, a liquid crystal response period 82, and a turn-on timing 83. The gate start pulse signal includes one gate start pulse 91 within the one frame 71. The gate scan signal includes n gate pulses 92 within the one frame 71.

The panel scan period 81 starts at the same time as the timing controller 43 inputs the gate start pulse 91 to the gate driver 62. In the panel scan period 81, the gate driver 62 drives the n gate lines in sequence by inputting the n gate pules 92 separately to each of the n gate lines. This causes the voltage corresponding to the image information 33 to be written to the m×n pixels. During the panel scan period 81, the backlight 41 is turned off. In the following, the term "panel scan" refers to driving the n gate lines in sequence by inputting the n gate pules 92 separately to each of the n gate lines.

The liquid crystal response period 82 is a period that follows the panel scan period 81. In the liquid crystal response period 82, the m×n pixels come to have the light transmittance corresponding to the voltage thus written in response to the voltage thus written. During the liquid crystal response period 82, the backlight 41 is turned off.

The turn-on timing 83 is a period that follows the liquid crystal response period 82. In the turn-on timing 83, the timing controller 43 turns on the backlight 41 in a case where the degree of opening of the eye as represented by the degree-of-opening information 32 indicates that the eye is open and turns off the backlight 41 in a case where the degree of opening of the eye indicates that the eye is closed. In turning on the backlight 41, the timing controller 43 causes the backlight 41 to glow with a set duty ratio, e.g. with a duty ratio of 10%. The timing controller 43 may cause the backlight 41 to glow at a first brightness level in a case where the degree of opening of the eye indicates that the eye is open and may cause the backlight 41 to glow at a second brightness level in a case where the degree of opening of the eye indicates that the eye is closed. The second brightness level is lower than the first brightness level.

The line-of-sight detection sensor 22 constitutes a detection unit that detects a degree of opening of an eye. The backlight 41 constitutes a light-emitting unit that emits light. The timing controller 43 constitutes a controller that controls, based on the degree of opening of the eye as represented by degree-of-opening information 32, the brightness of the light that is emitted by the backlight 41. The liquid crystal panel 42 is an example of a light modulation panel that modulates emitted light. For this reason, the liquid crystal panel 42 may be replaced by another type of light modulation panel. The liquid crystal panel 42 and the backlight 41 may be replaced by a self-luminous panel. In a case where the liquid crystal panel 42 and the backlight 41 are replaced by a self-luminous panel, the self-luminous panel constitutes a light-emitting unit that emits light. Further, the timing controller 43 constitutes a controller that controls, based on the degree of opening of the eye, the brightness of the light that is emitted by the self-luminous panel. An element other than the timing controller 43 may constitute a controller that controls, based on the degree of opening of the eye as represented by degree-of-opening information 32, the brightness of the light that is emitted by the backlight 41.

1.7 Flow of Control

Figure 4:
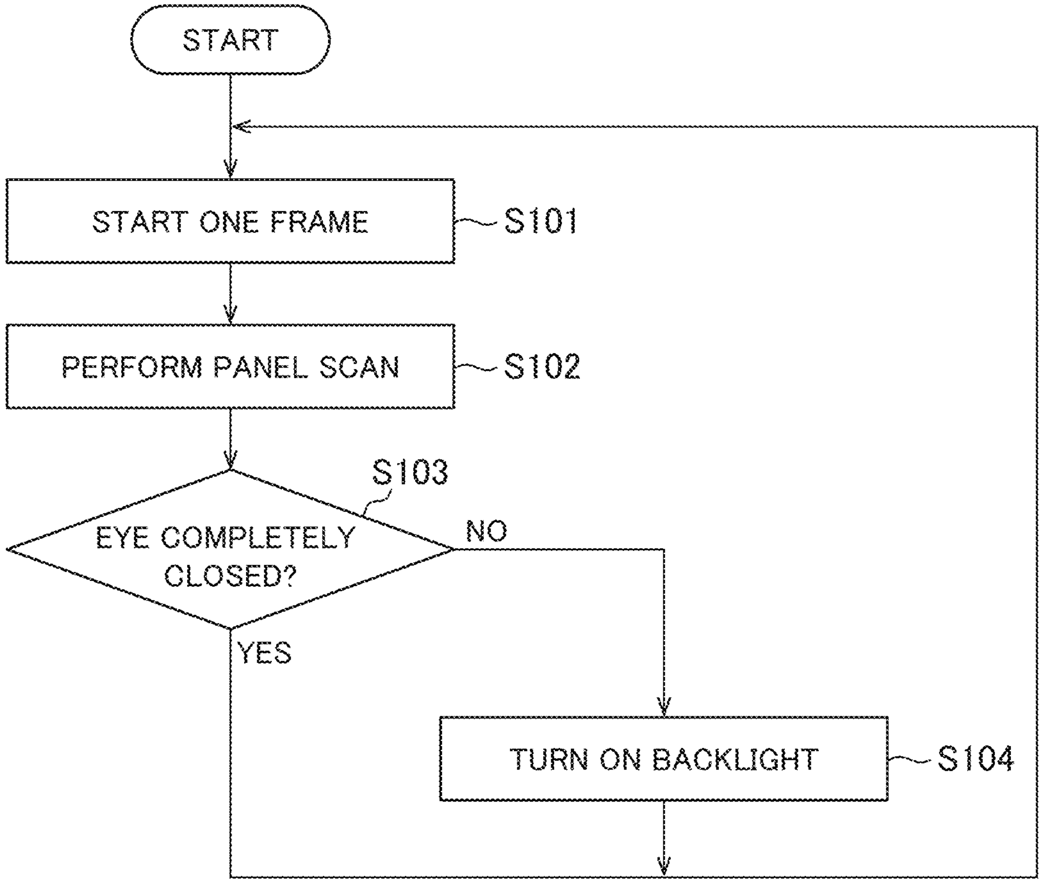
FIG. 4 is a flow chart showing the flow of control that is performed by the timing controller of the head-mounted device of the first embodiment.

FIG. 4 is a flow chart showing the flow of control that is performed by the timing controller of the head-mounted device of the first embodiment.

The timing controller 43 executes steps S101 to S104 shown in FIG. 4.

In step S101, the timing controller 43 starts one frame 71 by inputting a gate start pulse 91 to the gate driver 62.

In step S102 that follows, the timing controller 43 causes the gate driver 62 to perform a panel scan.

In step S103 that follows, the timing controller 43 determines, based on a degree of opening of an eye as represented by degree-of-opening information 32, whether the eye is completely closed. In a case where it is determined that the eye is completely closed, step S104 is not executed but step S101 is executed. In a case where it is determined that the eye is slightly open, step S101 is executed after step S104 has been executed.

In step S104 that follows, the timing controller 43 turns on the backlight 41.

Through a process from steps S101 to S104, in a case where the eye is completely closed, steps S101 to S103 are repeatedly executed, but step S104 is not executed. In a case where the eye is not completely closed, steps S101 to S104 are repeatedly executed. For this reason, whether step S104 is executed is determined according to whether the eye is completely closed.

Through the process from steps S101 to S104, in a case where the eye is closed by a blink or other actions, the timing controller 43 ends the one frame 71 while keeping the backlight 41 turned off during the turn-on timing 83. In a case where the eye is open, the timing controller 43 ends the one frame 71 after turning on the backlight 41 in the turn-on timing 83. This makes it possible to, in a case where the eye is closed, reduce the power consumption of the head-mounted device 1 as much as the backlight 41 needs electricity to get turned on.

In the liquid crystal response period 82, which is included in a pre-turn-on period 84 preceding the turn-on timing 83, the timing controller 43 makes a determination on whether to turn on the backlight 41, and in the turn-on timing 83, which follows the pre-turn-on period 84, the timing controller 43 turns on or off the backlight 41 according to the determination thus made. The liquid crystal response period 82, in which a determination on whether to turn on the backlight 41 is made, is a period that follows the panel scan period 81. For this reason, the timing controller 43 causes the gate driver 62 to perform a panel scan regardless of the determination.

1.8 Comparison Between Comparative Example and First Embodiment

Figure 5:
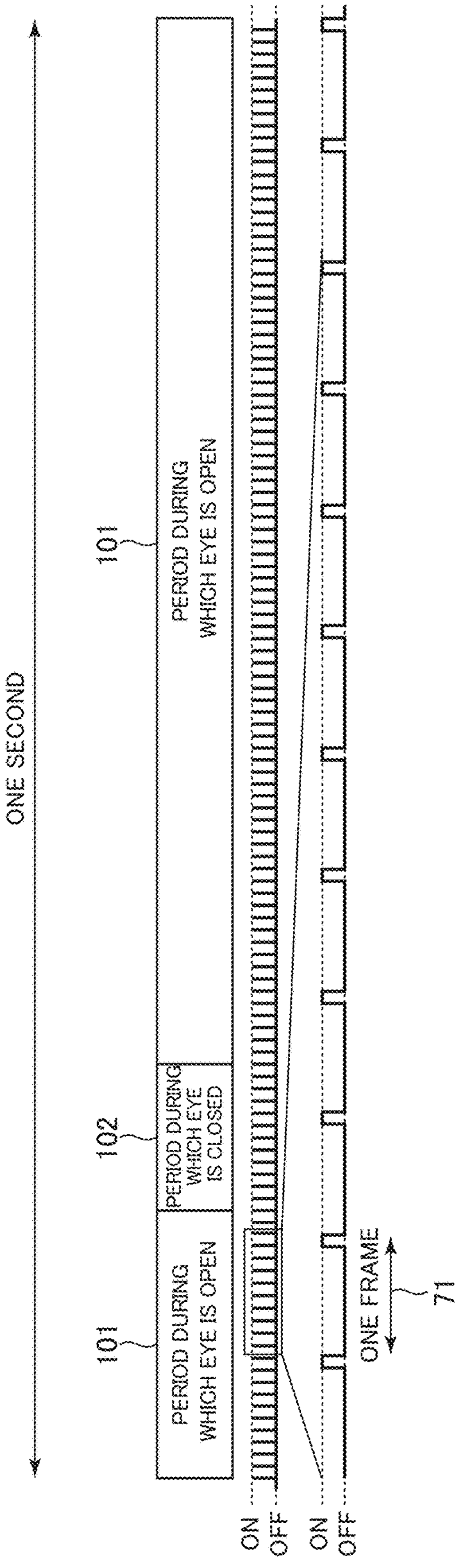
FIG. 5 is a timing chart showing time changes in state of a backlight of a head-mounted device of a comparative example.
Figure 6:
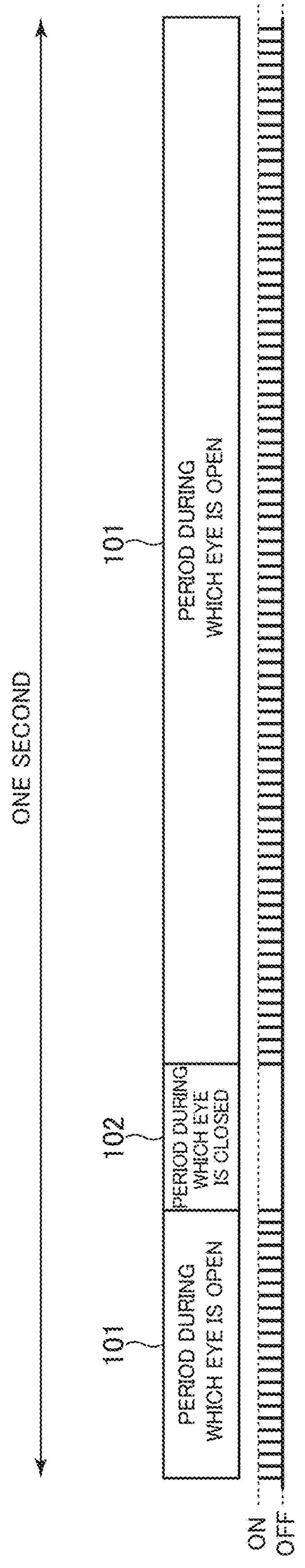
FIG. 6 is a timing chart showing time changes in the backlight of the head-mounted device of the first embodiment.

FIG. 5 is a timing chart showing time changes in state of a backlight of a head-mounted device of a comparative example. FIG. 6 is a timing chart showing time changes in the backlight of the head-mounted device of the first embodiment.

In each of the timing charts of FIGS. 5 and 6, the horizontal axis represents time, and the vertical axis represents the state of the backlight.

In the comparative example, as shown in FIG. 5, the backlight goes on and off with steady cycles and goes on at least once in one frame 71. For this reason, the backlight goes on in both a frame 71 belonging to a period 101 during which the eye is open and a frame 71 belonging to a period 102 during which the eye is closed by a blink or other actions.

On the other hand, in the first embodiment, as shown in FIG. 6, the backlight 41 goes on and off with steady cycles in a period 101 during which the eye is open but stops going on and off with steady cycles in a period 102 during which the eye is closed by a blink or other actions. For this reason, the backlight 41 goes on in a frame 71 belonging to a period 101 during which the eye is open, but does not go on in a frame 71 belonging to a period 102 during which the eye is closed by a blink or other actions.

1.9 Trial Calculation of Rate of Decrease in Power Consumption of Backlight

The typical cycle of blinking is said to be 10 to 30 times/minute. Further, the typical duration of blinking is said to be 0.1 second to 0.3 second. Accordingly, trial calculations of the number of frames in which the backlight 41 does not glow and the rate of decrease in power consumption of the backlight 41 due to the presence of a frame in which the backlight 41 does not glow were performed for the following cases 1 to 5.

Case 1: Case where the cycle of blinking is 10 times/minute and the duration of blinking is 0.1 second;

Case 2: Case where the cycle of blinking is 15 times/minute and the duration of blinking is 0.1 second;

Case 3: Case where the cycle of blinking is 15 times/minute and the duration of blinking is 0.15 second;

Case 4: Case where the cycle of blinking is 20 times/minute and the duration of blinking is 0.2 second; and Case 5: Case where the cycle of blinking is 30 times/minute and the duration of blinking is 0.3 second.

The trial calculations were performed on the assumption that the frame frequency is 120 Hz and the number of turn-on timings 83 within one minute was 7200. Results of the trial calculations are shown in Table 1.

TABLE 1

| | Case 1 | Case 2 | Case 3 | Case 4 | Case 5 |
|---|---|---|---|---|---|
| Cycle of blinking (10 to 30 times/minute) | 10 | 15 | 15 | 20 | 30 |
| Duration of blinking (0.1 to 0.3 second) | 0.1 | 0.1 | 0.15 | 0.2 | 0.3 |
| Frame frequency | 120 | 120 | 120 | 120 | 120 |
| Number of turn-on timings within one minute | 7200 | 7200 | 7200 | 7200 | 7200 |
| Number of turn-on timings skipped | 120 | 180 | 270 | 480 | 1080 |
| Rate of decrease in power consumption of backlight | 1.7% | 2.5% | 3.8% | 6.7% | 15.0% |

As shown in Table 1, in Case 1, where the cycle of blinking is 10 times/minute, which is the lower limit of the range of the typical cycle of blinking, and the duration of blinking is 0.1 second, which is the lower limit of the range of the typical duration of blinking, the rate of decrease in power consumption of the backlight 41 is 1.7%. In Case 3, where the cycle of blinking is 15 times/minute, which is the average cycle of blinking, and the duration of blinking is 0.15 second, which is the average duration of blinking, the rate of decrease in power consumption of the backlight 41 is 3.8%. Thus, the presence of frames in which the backlight 41 does not glow makes it possible to reduce the power consumption of the backlight 41.

1.10 Line-of-Sight Detection Sensor

The line-of-sight detection sensor 22 needs to detect changes in the degree of opening of the eye caused by a blink or other actions. For this reason, the image sensor of the line-of-sight detection sensor 22 needs to be driven at such a frequency as to be able to track changes in the degree of opening of the eye caused by a blink or other actions, e.g. needs to be driven at 90 to 120 Hz. In a case where the image sensor is driven at 120 Hz, each frame of shooting by the image sensor has a length of approximately 8 ms.

The duration of closure of the eye by a blink is approximately 0.1 to 0.3 second. For this reason, in order to highly accurately detect changes in the degree of opening of the eye caused by a blink, the line-of-sight detection sensor 22 needs to determine, within a period of time sufficiently shorter than the duration, e.g. at time intervals of 80 ms or shorter, whether the eye is open. For this reason, in a case where each frame of shooting by the image sensor has a length of approximately 8 ms, the line-of-sight detection sensor 22 needs to detect, every ten frames, whether the eye is open. Desirably, the line-of-sight detection sensor 22 needs to detect, every few frames, e.g. every two or three frames, whether the eye is open. More desirably, the line-of-sight detection sensor 22 needs to detect, every frame, whether the eye is open.

The line-of-sight detection sensor 22 needs only detect whether the eye is open. For this reason, in a case where the eyeball, the iris, or the pupil is detected by the image processing circuit, the line-of-sight detection sensor 22 determines that the eye is open, and in a case where the eyeball, the iris, or the pupil is not detected by the image processing circuit, the line-of-sight detection sensor 22 determines that the eye is closed.

2 Second Embodiment

The following describes points of difference of a second embodiment from the first embodiment. As for the points that are not described, configurations that are similar to those employed in the first embodiment are also employed in the second embodiment.

Figure 7:
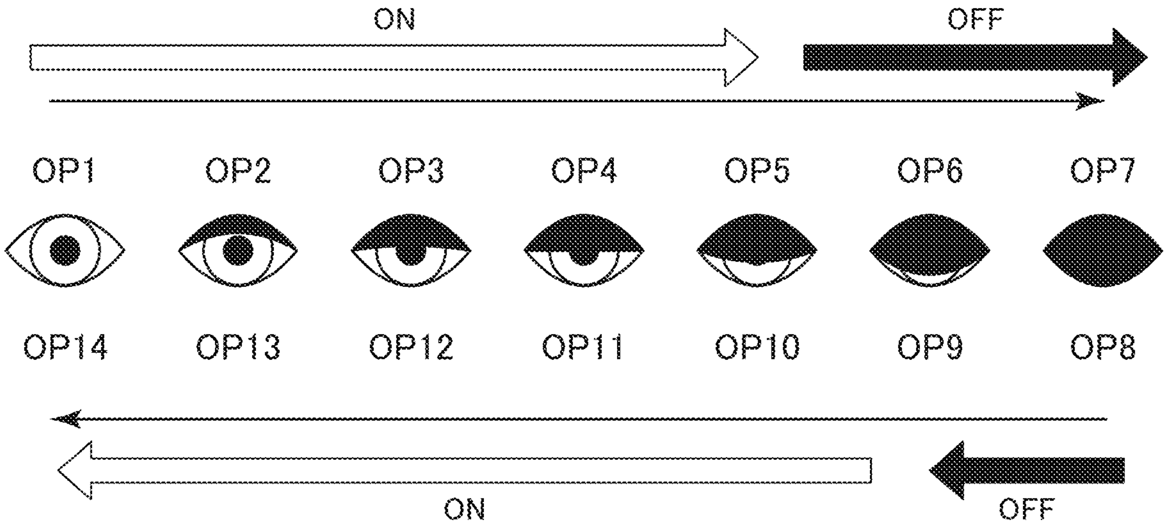
FIG. 7 is a diagram showing changes during a blink in state of a backlight of a head-mounted device of a second embodiment.

FIG. 7 is a diagram showing changes during a blink in state of a backlight of a head-mounted device of the second embodiment.

In the second embodiment, as shown in FIG. 7, in a case where the degree of opening of the eye as represented by the degree-of-opening information 32 becomes smaller from a degree of opening OP1 toward a degree of opening OP7 with passage of time, the timing controller 43 turns on the backlight 41 when the degree of opening of the eye is larger than a first specific degree of opening OP5 and turns off the backlight 41 when the degree of opening of the eye is smaller than the first specific degree of opening OP5. In a case where the degree of opening of the eye becomes larger from a degree of opening OP8 toward a degree of opening OP14 with passage of time, the timing controller 43 turns off the backlight 41 when the degree of opening of the eye is smaller than a second specific degree of opening OP9 and turns on the backlight 41 when the degree of opening of the eye is larger than the second specific degree of opening OP9. The first specific degree of opening OP5 and the second specific degree of opening OP9 indicate that the eye is not completely closed. The first specific degree of opening OP5 is such a degree of opening that the person 201 becomes unable to recognize an image displayed by the display 23. The second specific degree of opening OP9 is such a degree of opening of the eye one stage smaller than the degree of opening OP10 that the person 201 becomes able to recognize an image displayed by the display 23. For this reason, it is desirable that the second specific degree of opening OP9 be smaller than the first specific degree of opening OP5.

For this reason, the timing controller 43 turns off the backlight 41 in a case where the degree of opening of the eye as represented by the degree-of-opening information 32 becomes smaller than the first specific degree of opening OP5. Further, the timing controller 43 turns on the backlight 41 in a case where the degree of opening of the eye becomes larger than the second specific degree of opening OP9.

By so doing, the timing controller 43 changes the state of the backlight 41 from an on-state to an off-state while the eye is being gradually closed in the first half of a blink. The timing controller 43 changes the state of the backlight 41 from an off-state to an on-state while the eye is being gradually opened in the second half of the blink. As a result of this, a backlight on-period during which the backlight 41 is on is shortened to a period in which the degree of opening of the eye changes from the degree of opening OP1, which indicates that the eye is completely open, to the first specific degree of opening OP5 and a period in which the degree of opening of the eye changes from the second specific degree of opening OP9 to the degree of opening OP14, which indicates that the eye is completely open. Further, an off-period during which the backlight 41 is off can be extended to a period in which the degree of opening of the eye changes from the first specific degree of opening OP5 to the second specific degree of opening OP9 via degrees of opening OP7 and OP8 that indicate that the eye is completely closed. This makes it possible to further reduce the power consumption of the backlight 41.

The backlight on-period includes a period during which the eye is not completely closed. However, during this period, the eye has a remarkably dark field of view. For this reason, even if the backlight 41 goes off in this period, the person 201 is hardly hindered from recognizing an image displayed on the display 23.

Figure 8:
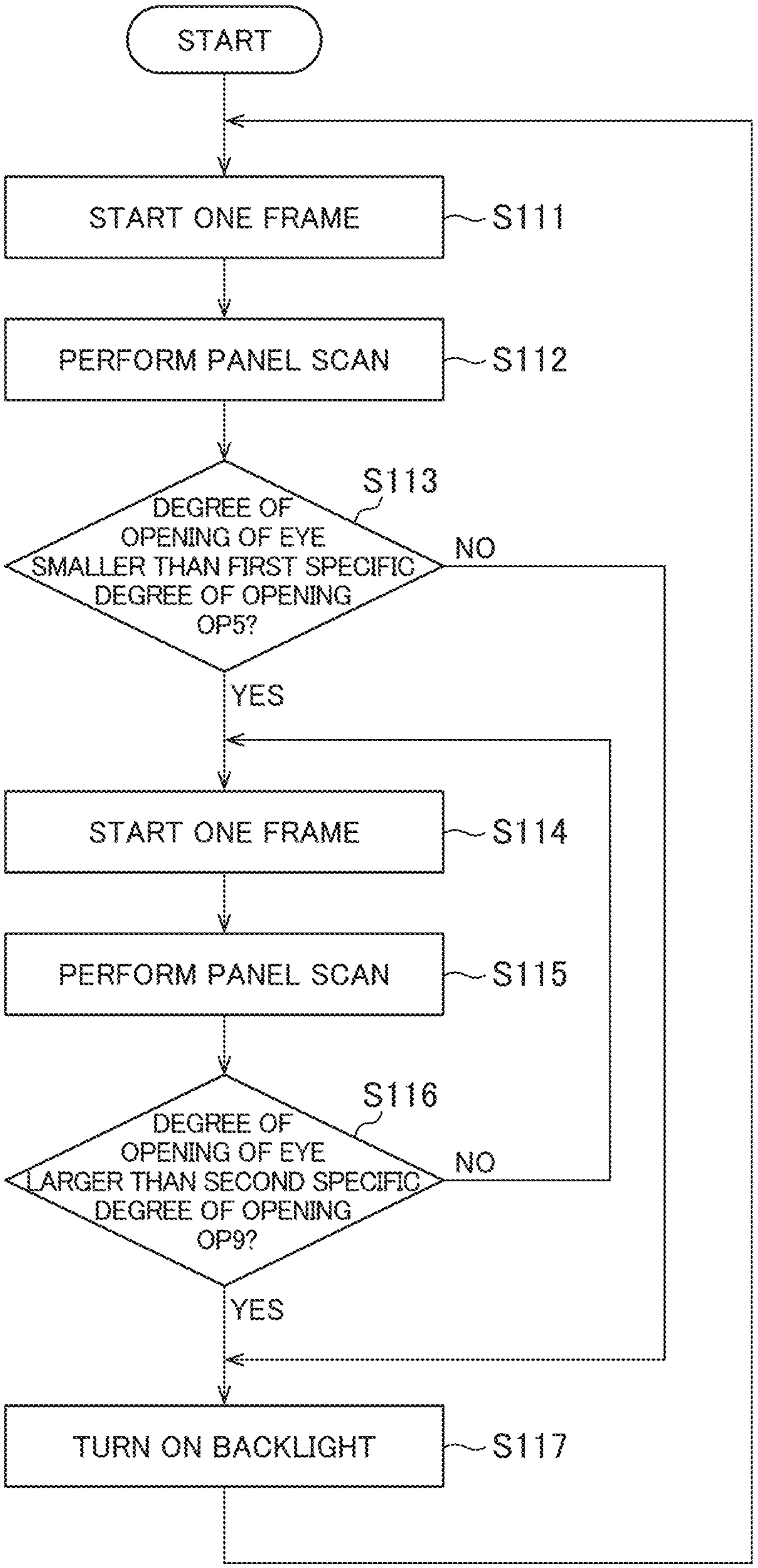
FIG. 8 is a flow chart showing the flow of control that is performed by a timing controller of the head-mounted device of the second embodiment.

FIG. 8 is a flow chart showing the flow of control that is performed by the timing controller of the head-mounted device of the second embodiment.

In the second embodiment, the timing controller 43 executes steps S111 to S117. It is assumed that the eye is completely open at a point in time where step S111 is executed.

In step S111, the timing controller 43 inputs a gate start pulse 91 to the gate driver 62. By so doing, the timing controller 43 starts one frame 71.

In step S112 that follows, the timing controller 43 causes the gate driver 62 to perform a panel scan.

In step S113 that follows, the timing controller 43 determines whether the degree of opening of the eye as represented by the degree-of-opening information 32 is smaller than the first specific degree of opening OP5. In a case where it is determined that the degree of opening of the eye is smaller than the first specific degree of opening OP5, step S114 is executed. In a case where it is determined that the degree of opening of the eye is larger than the first specific degree of opening OP5, step S111 is executed after step S117 has been executed.

In step S117, the timing controller 43 turns on the backlight 41.

Through a process from steps S111 to S113 and S117, in a case where the eye is being gradually closed, steps S111 to S113 and S117 are repeatedly executed before the degree of opening of the eye becomes smaller than the first specific degree of opening OP5. For this reason, the backlight 41 goes on. After the degree of opening of the eye has become smaller than the first specific degree of opening OP5, steps S111 to S113 and S117 stop being repeatedly executed, and steps S114 to S116 are executed.

In step S114, the timing controller 43 starts one frame 71 by inputting a gate start pulse 91 to the gate driver 62.

In step S115 that follows, the timing controller 43 causes the gate driver 62 to perform a panel scan.

In step S116 that follows, the timing controller 43 determines whether the degree of opening of the eye as represented by the degree-of-opening information 32 is larger than the second specific degree of opening OP9. In a case where it is determined that the degree of opening of the eye is larger than the second specific degree of opening OP9, step S111 is executed after step S117 has been executed. In a case where it is determined that the degree of opening of the eye is smaller than the second specific degree of opening OP9, step S114 is executed.

Through a process from steps S114 to S116 and S117, in a case where the eye is being gradually opened, steps S114 to S116 are repeatedly executed and step S117 is not executed before the degree of opening of the eye becomes larger than the second specific degree of opening OP9. For this reason, the backlight 41 does not go on. After the degree of opening of the eye has become larger than the second specific degree of opening OP9, steps S114 to S116 stop being repeatedly executed, and step S117 is executed. For this reason, the backlight 41 goes on.

Through the process from step S111 to S117, the backlight 41 goes on in step S117 in a case where it is determined in step S113 that the degree of opening of the eye is larger than the first specific degree of opening OP5 and a case where it is determined in step S116 that the degree of opening of the eye is larger than the second specific degree of opening OP9. In a period from a point in time where the degree of opening of the eye as represented by the degree-of-opening information 32 reaches the first specific degree of opening OP5 to a point in time where the degree of opening of the eye reaches the second specific degree of opening OP9, the timing controller 43 ends the one frame 71 while keeping the backlight 41 turned off. Further, in a period preceding the point in time where the degree of opening of the eye reaches the first specific degree of opening OP5 and a period following the point in time where the degree of opening of the eye reaches the second specific degree of opening OP9, the timing controller 43 ends the one frame 71 after turning on the backlight 41. This makes it possible to, in a case where the eye is closed, reduce the power consumption of the head-mounted device 1 as much as the backlight 41 needs electricity to get turned on.

In the second embodiment, the line-of-sight detection sensor 22 detects the degree of opening of the eye so that the degree of opening of the eye can be identified as any of three degrees of opening of the eye differing from one another. For this reason, in the line-of-sight detection sensor 22, for example, a region of the eyeball is detected by the image processing circuit, and the degree of opening of the eye is determined based on the area of the region thus detected of the eyeball. Further, in a case where the area of a region of the eyeball as detected in a next frame is smaller than the area of a region of the eyeball as detected in a previous frame, it is determined that the degree of opening of the eye becomes smaller with passage of time. In a case where the area of the region of the eyeball as detected in the next frame is larger than the area of the region of the eyeball as detected in the previous frame, it is determined that the degree of opening of the eye becomes larger with passage of time.

In a case where the degree of opening of the eye is determined based on the area of a region of the eyeball, the degrees of opening OP1 and OP14, which indicate the eye is completely open, are degrees of opening at which the area of the region of the eyeball reaches its maximum. The degrees of opening OP7 and OP8, which indicate that the eye is completely closed, are degrees of opening at which the area of the region of the eyeball reaches its minimum. In a case where the area of the region of the eyeball is, for example, 0.2 time as large as the maximum area, the degree of opening is the first specific degree of opening OP5. In a case where the area of the region of the eyeball is, for example, 0.1 time as large as the maximum area, the degree of opening is the second specific degree of opening OP9.

3 Third Embodiment

The following describes points of difference of a third embodiment from the second embodiment. As for the points that are not described, configurations that are similar to those employed in the second embodiment are also employed in the third embodiment.

Figure 9:
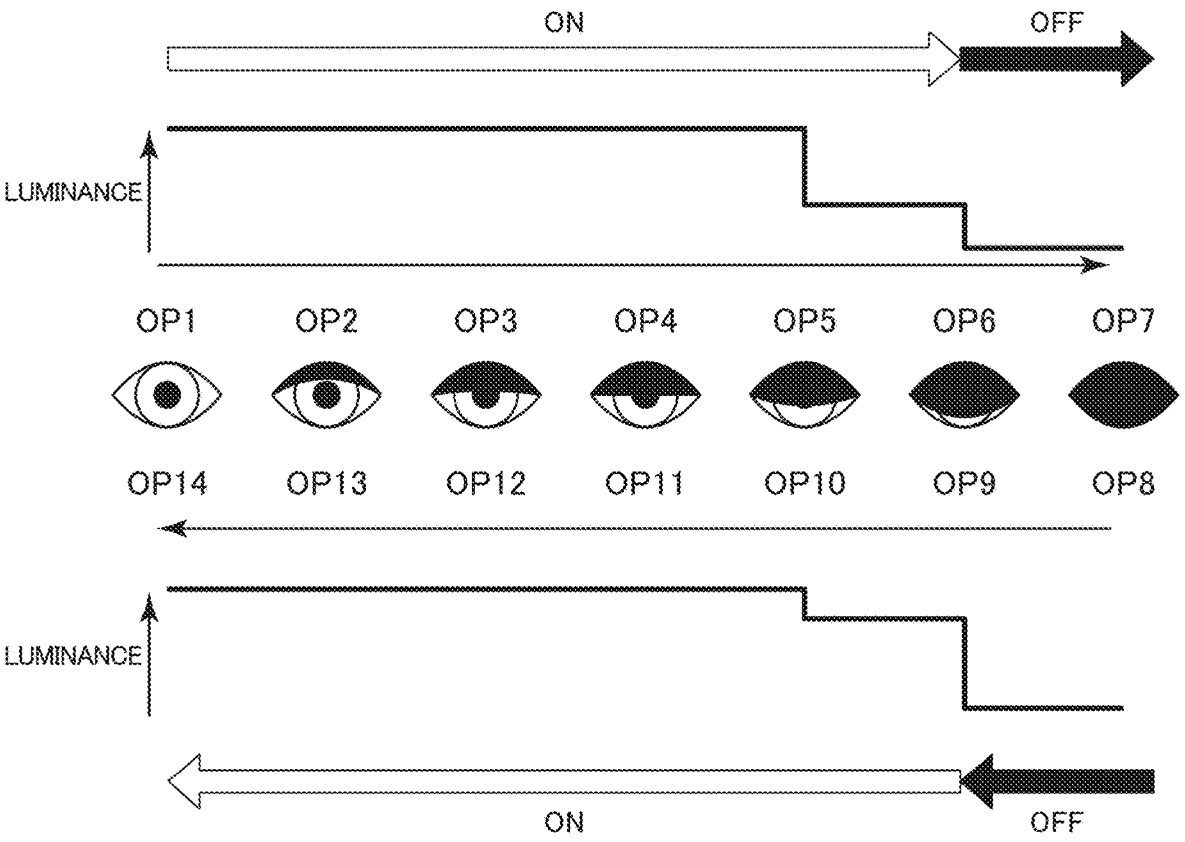
FIG. 9 is a diagram showing a state of a backlight of a head-mounted device of a third embodiment and changes during a blink in luminance of light that is emitted by the backlight.

FIG. 9 is a diagram showing a state of a backlight of a head-mounted device of the third embodiment and changes during a blink in luminance of light that is emitted by the backlight.

In the third embodiment, as shown in FIG. 9, in a case where the degree of opening of the eye as represented by the degree-of-opening information 32 becomes smaller from a degree of opening OP1 toward a degree of opening OP7 with passage of time, the timing controller 43 brightens the backlight 41 when the degree of opening of the eye is larger than a first specific degree of opening OP5, dims the backlight 41 when the degree of opening of the eye is smaller than the first specific degree of opening OP5 but larger than a third specific degree of opening OP6, and turns off the backlight 41 when the degree of opening of the eye is smaller than the third specific degree of opening OP6. In a case where the degree of opening of the eye as represented by the degree-of-opening information 32 becomes larger from a degree of opening OP8 toward a degree of opening OP14 with passage of time, the timing controller 43 turns off the backlight 41 when the degree of opening of the eye is smaller than a fourth specific degree of opening OP9, dims the backlight 41 when the degree of opening of the eye is larger than the fourth specific degree of opening OP9 but smaller than a second specific degree of opening OP10, and brightens the backlight 41 when the degree of opening of the eye is larger than the second specific degree of opening OP10. The first specific degree of opening OP5, the second specific degree of opening OP10, the third specific degree of opening OP6, and the fourth specific degree of opening OP9 indicate that the eye is not completely closed. The first specific degree of opening OP5 and the second specific degree of opening OP10 are such degrees of opening that the person 201 becomes unable to recognize an image displayed by the display 23. The third specific degree of opening OP6 and the fourth specific degree of opening OP9 are each such a degree of opening of the eye one stage smaller than the first specific degree of opening OP5 and the second specific degree of opening OP10 that the person 201 becomes able to recognize an image displayed by the display 23. For this reason, the third specific degree of opening OP6 and the fourth specific degree of opening OP9 are smaller than the first specific degree of opening OP5 and the second specific degree of opening OP10. The luminance of light that is emitted by the backlight 41 in a case where the backlight 41 is dimmed is lower than the luminance of light that is emitted by the backlight 41 in a case where the backlight 41 is brightened.

For this reason, after the degree of opening of the eye as represented by the degree-of-opening information 32 has become smaller than the first specific degree of opening OP5, the timing controller 43 causes the brightness of light that is emitted by the backlight 41 to decrease in stages as the degree of opening of the eye becomes smaller. Further, before the degree of opening of the eye becomes larger than the second specific degree of opening OP10, the timing controller 43 causes the brightness of light that is emitted by the backlight 41 to increase in stages as the degree of opening of the eye becomes larger. The timing controller 43 may cause the brightness of light that is emitted by the backlight 41 to continuously decrease as the degree of opening of the eye becomes smaller. The timing controller 43 may cause the brightness of light that is emitted by the backlight 41 to continuously increase as the degree of opening of the eye becomes larger. This makes it hard for the person 201 to sense a change in brightness of light that is emitted by the display 23.

4 Fourth Embodiment

The following describes points of difference of a fourth embodiment from the first embodiment. As for the points that are not described, configurations that are similar to those employed in the first embodiment are also employed in the fourth embodiment.

Figure 10:
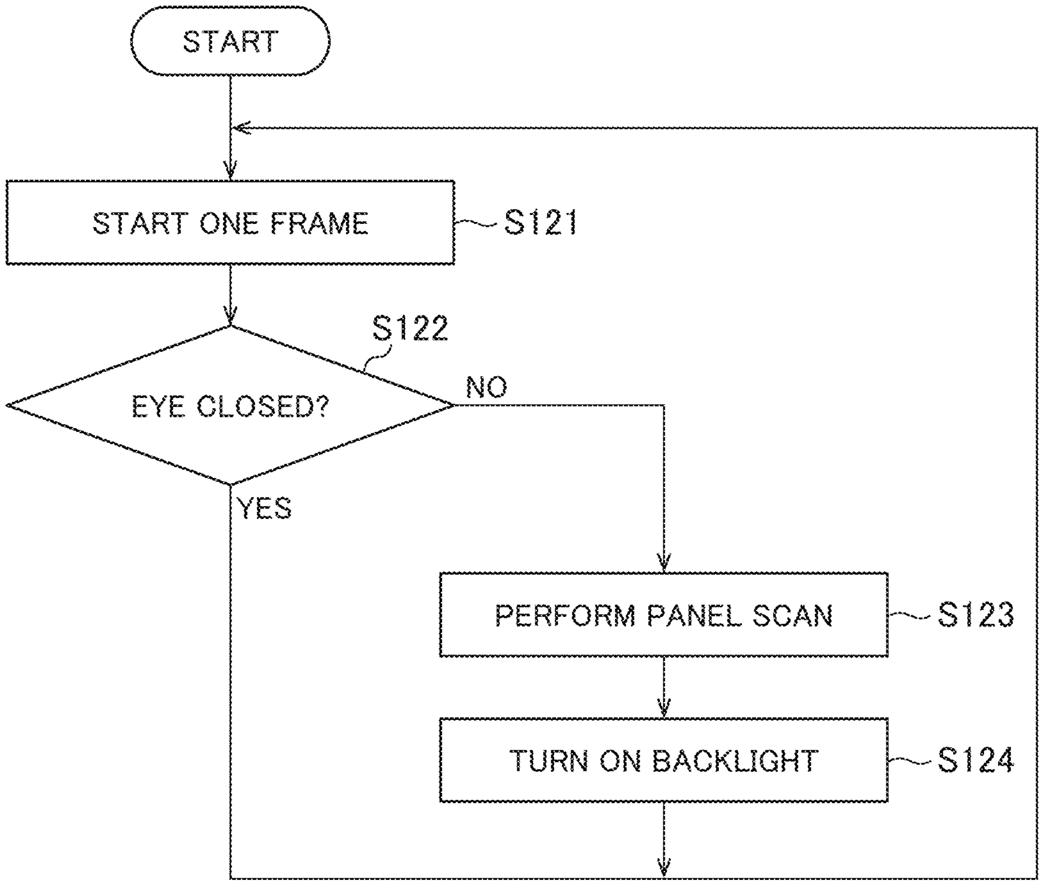
FIG. 10 is a flow chart showing the flow of control that is performed by a timing controller of a head-mounted device of a fourth embodiment.

FIG. 10 is a flow chart showing the flow of control that is performed by a timing controller of a head-mounted device of the fourth embodiment.

In the fourth embodiment, the timing controller 43 executes steps S121 to S124 shown in FIG. 10.

In step S121, the timing controller 43 starts one frame 71 by inputting a gate start pulse 91 to the gate driver 62.

In step S122 that follows, the timing controller 43 determines whether the eye is completely closed. In a case where it is determined that the eye is completely closed, steps S123 and S124 are not executed but step S121 is executed. In a case where it is determined that the eye is slightly open, step S121 is executed after steps S123 and S124 have been executed.

In step S124, the timing controller 43 causes the gate driver 62 to perform a panel scan.

In step S124 that follows, the timing controller 43 turns on the backlight 41.

Through a process from steps S121 to S124, in a case where the eye is completely closed, steps S121 and S122 are repeatedly executed, but steps S123 and S124 are not executed. In a case where the eye is not completely closed, steps S121 to S124 are repeatedly executed. For this reason, whether steps S123 and S124 are executed is determined according to whether the eye is completely closed.

In the fourth embodiment, prior to the panel scan period 81, the timing controller 43 makes a determination on whether to turn on the backlight 41, and in turning off the backlight 41 according to the determination, the timing controller 43 causes the gate driver 62 to stop performing a panel scan in the panel scan period 81. This makes it possible to, in a case where the eye is closed, reduce the power consumption of the head-mounted device 1 as much as the gate driver 62 needs electricity to perform a panel scan.

The present disclosure is not limited to the foregoing embodiments but may be replaced by configurations that are substantially identical to those shown in the foregoing embodiments, configurations that bring about working effects that are identical to those brought about by the foregoing embodiments, or configurations that make it possible to attain objects that is identical to those attained by the foregoing embodiments.

The present disclosure contains subject matter related to that disclosed in Japanese Priority Patent Application JP 2024-122407 filed in the Japan Patent Office on Jul. 29, 2024, the entire contents of which are hereby incorporated by reference. In the determination of step S122, it is not limited to cases where the eyes are completely closed. As in the cases of step S113 (FIG. 8) and step S116 (FIG. 8), a case where the eyes are slightly open may be included.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted device, comprising:
- a detection unit that detects a degree of eye opening of an eye;
- a display including a light-emitting unit that emits light; and
- a controller that controls a brightness of the light based on the degree of eye opening, wherein controlling the brightness, based on the degree of eye opening, includes:
  - making a determination of the brightness, based on the degree of eye opening, during a pre-turn-on period that is included in each frame, and
  - controlling the brightness, based on a result of the determination, during a turn-on timing that is included in the frame, and that follows the pre-turn-on period in the frame.

2. The head-mounted device according to claim 1, wherein controlling the brightness, based on the degree of eye opening, further includes decreasing the brightness in a case that the degree of eye opening indicates that the eye is closed.

3. The head-mounted device according to claim 2, wherein decreasing the brightness comprises turning off the display.

4. The head-mounted device according to claim 1, wherein:
- the light-emitting unit comprises a backlight, and
- the display comprises a liquid crystal panel that modulates the light.

5. The head-mounted device according to claim 4, wherein:
- the controller drives a plurality of gate lines of the liquid crystal panel in sequence during a panel scan period that is included in the pre-turn-on period, and
- making the determination during the pre-turn-on period includes making the determination after the panel scan period is passed.

6. The head-mounted device according to claim 4, wherein;
- the controller drives a plurality of gate lines of the liquid crystal panel in sequence during a panel scan period that is included in the pre-turn-on period,
- making the determination during the pre-turn-on period includes making the determination before the panel scan period is started, and
- controlling the brightness, based on the determination, comprises decreasing the brightness, and
- while the brightness is being decreased, the controller stops driving the plurality of gate lines in sequence during the panel scan period.

7. The head-mounted device according to claim 1, wherein controlling the brightness, based on the degree of eye opening, further includes decreasing the brightness in a case that the degree of eye opening becomes smaller than a specific degree of eye opening indicating that the eye is not completely closed.

8. The head-mounted device according to claim 7, wherein:
- the specific degree of eye opening is comprises a first specific degree of eye opening, and
- controlling the brightness, based on the degree of eye opening, further includes increasing the brightness in a case that the degree of eye opening becomes larger than a second specific degree of eye opening indicating that the eye is not completely closed.

9. The head-mounted device according to claim 8, wherein the second specific degree of eye opening is smaller than the first specific degree of eye opening.

10. The head-mounted device according to claim 1, wherein controlling the brightness, based on the degree of eye opening, further includes decreasing the brightness as the degree of eye opening becomes smaller in a case that the degree of eye opening is smaller than a set degree of eye opening.

11. The head-mounted device according to claim 1, wherein the detection unit detects the degree of eye opening at time intervals of 80 ms or shorter.

* * * * *